US012318061B2

(12) United States Patent
Moeller et al.

(10) Patent No.: US 12,318,061 B2
(45) Date of Patent: Jun. 3, 2025

(54) FLOOR TOOL ATTACHMENT FOR USE WITH VACUUM CLEANER

(71) Applicant: MILWAUKEE ELECTRIC TOOL CORPORATION, Brookfield, WI (US)

(72) Inventors: Scott T. Moeller, Richfield, WI (US); Christopher S. Spaulding, Green Bay, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/370,093

(22) Filed: Jul. 8, 2021

(65) Prior Publication Data

US 2022/0007909 A1 Jan. 13, 2022

Related U.S. Application Data

(60) Provisional application No. 63/049,947, filed on Jul. 9, 2020.

(51) Int. Cl.
  *A47L 9/28* (2006.01)
  *A46B 13/00* (2006.01)
  (Continued)

(52) U.S. Cl.
  CPC .......... *A47L 9/2884* (2013.01); *A46B 13/001* (2013.01); *A46B 13/02* (2013.01);
  (Continued)

(58) Field of Classification Search
  CPC . A47L 9/02; A47L 9/04; A47L 9/0405; A47L 9/0411; A47L 9/0461;
  (Continued)

(56) References Cited

U.S. PATENT DOCUMENTS 2,688,671 A * 9/1954 Segesman ................. A47L 5/28
                                                    15/354
3,184,775 A * 5/1965 Downey ............. A47L 11/4041
                                                    15/328
(Continued)

FOREIGN PATENT DOCUMENTS

AU    2020100206 A4    3/2020
CN      1166338 C      9/2004
(Continued)

OTHER PUBLICATIONS

Dewalt 20V Max Cordless Vacuum Kit, Wet/Dry, Portable, 1/2-Gallon (DCV517M1), Yellow—Amazon.com, Dewalt, pp. 1-10 (Year: 2017).*

(Continued)

*Primary Examiner* — Brian D Keller
*Assistant Examiner* — Sidney D Full
(74) *Attorney, Agent, or Firm* — Michael Best & Friedrich LLP

(57) ABSTRACT

An attachment for a vacuum cleaner includes a head, a brush roll, an electric motor, and an attachment conduit. The head includes a suction opening, a brush roll cavity, and a battery cavity defined therein. The brush roll cavity is in fluid communication with the suction opening. The battery cavity has an elongate shape and a first longitudinal axis. The brush roll is rotatably coupled to the head. A majority of the brush roll is disposed within the brush roll cavity. The brush roll is rotatable about a rotational axis. The electric motor is disposed within the head. The electric motor drives the brush roll. The attachment conduit is in fluid communication with the suction opening. The attachment conduit is coupled to the head and has a second longitudinal axis. Each of the first longitudinal axis and the second longitudinal axis is angled relative to the rotational axis.

8 Claims, 8 Drawing Sheets

(51) Int. Cl.
*A46B 13/02* (2006.01)
*A47L 9/04* (2006.01)
*A47L 9/24* (2006.01)
*H01M 50/244* (2021.01)

(52) U.S. Cl.
CPC ........... *A47L 9/0411* (2013.01); *A47L 9/0444* (2013.01); *A47L 9/0477* (2013.01); *A47L 9/242* (2013.01); *H01M 50/244* (2021.01); *A46B 2200/3033* (2013.01); *H01M 2220/30* (2013.01)

(58) Field of Classification Search
CPC .... A47L 9/0466; A47L 9/0472; A47L 9/0477; A47L 9/0483; A47L 9/06; A47L 9/2884; A47L 9/2878; A47L 9/2857; A47L 5/22; A47L 5/225; A47L 5/24; A47L 5/26; A47L 9/242; A47L 9/0444; A46B 13/02; A46B 13/001; A46B 2200/3033; H01M 50/244; H01M 2220/30
See application file for complete search history.

(56) References Cited

U.S. PATENT DOCUMENTS

| | | | |
|---|---|---|---|
| 5,014,386 A | | 5/1991 | Worwag |
| 5,504,970 A | * | 4/1996 | Neshat ............. A47L 5/26 |
| | | | D32/18 |
| 6,134,745 A | * | 10/2000 | Worwag ............. A47L 9/32 |
| | | | 15/368 |
| 6,345,408 B1 | | 2/2002 | Nagai et al. |
| 6,345,411 B1 | * | 2/2002 | Kato .............. A47L 9/2873 |
| | | | 15/377 |
| 6,510,585 B2 | | 1/2003 | Kalman et al. |
| 6,581,240 B2 | | 6/2003 | Kaffenberger |
| 6,732,404 B2 | | 5/2004 | Fukuoka et al. |
| 6,742,220 B2 | | 6/2004 | Nagai et al. |
| 6,763,549 B1 | | 7/2004 | Peters |
| 6,813,809 B2 | | 11/2004 | Worwag |
| 6,813,810 B2 | | 11/2004 | Beynon |
| 6,823,559 B2 | | 11/2004 | Kaffenberger et al. |
| 7,069,620 B2 | | 7/2006 | Bagwell |
| 7,171,723 B2 | | 2/2007 | Kobayashi et al. |
| 7,316,050 B2 | | 1/2008 | Worwag |
| 7,503,098 B2 | | 3/2009 | Stein |
| 7,526,834 B2 | | 5/2009 | Coleman |
| 7,578,025 B2 | | 8/2009 | Kostreba |
| 7,770,257 B2 | | 8/2010 | Kim |
| 7,849,558 B2 | | 12/2010 | Ivarsson et al. |
| 7,861,351 B2 | * | 1/2011 | Ho ................ A47L 11/33 |
| | | | 15/52.1 |
| 7,971,315 B2 | | 7/2011 | Kim et al. |
| 8,037,571 B2 | | 10/2011 | Butts et al. |
| 8,141,203 B2 | | 3/2012 | Ashbee |
| 8,214,967 B2 | | 7/2012 | Knox et al. |
| 8,720,001 B2 | | 5/2014 | Courtney et al. |
| 8,720,004 B2 | | 5/2014 | Ashbee |
| 9,015,902 B2 | | 4/2015 | Genn et al. |
| 9,192,273 B2 | * | 11/2015 | Eriksson ............. A47L 11/4041 |
| 9,314,139 B2 | | 4/2016 | Conrad et al. |
| D761,508 S | | 7/2016 | Lu et al. |
| D763,528 S | | 8/2016 | Lu et al. |
| 9,420,925 B2 | | 8/2016 | Conrad et al. |
| 9,451,853 B2 | | 9/2016 | Conrad et al. |
| D773,137 S | | 11/2016 | Niedzwecki et al. |
| D773,764 S | | 12/2016 | Niedzwecki et al. |
| 9,565,981 B2 | | 2/2017 | Conrad et al. |
| 9,585,530 B2 | | 3/2017 | Conrad et al. |
| 9,661,964 B2 | | 5/2017 | Conrad et al. |
| 9,706,887 B2 | | 7/2017 | Genn et al. |
| 9,801,516 B2 | * | 10/2017 | Zheng ............. A47L 11/4008 |
| 10,004,370 B2 | | 6/2018 | Isley et al. |
| 10,052,002 B2 | | 8/2018 | Andrews et al. |
| 11,510,544 B2 | * | 11/2022 | Khubani ............. A46B 13/001 |
| 2002/0042969 A1 | | 4/2002 | Nagai et al. |
| 2006/0037173 A1 | | 2/2006 | Gursel |
| 2006/0277713 A1 | | 12/2006 | Sandlin et al. |
| 2010/0005614 A1 | | 1/2010 | Cochran et al. |
| 2010/0050373 A1 | * | 3/2010 | Kaffenberger ....... H01M 50/247 |
| | | | 15/383 |
| 2010/0154150 A1 | | 6/2010 | McLeod |
| 2010/0306953 A1 | | 12/2010 | Chan |
| 2011/0078871 A1 | | 4/2011 | Kaffenberger et al. |
| 2012/0079671 A1 | | 4/2012 | Stickney et al. |
| 2014/0033471 A1 | | 2/2014 | Toole et al. |
| 2015/0265116 A1 | | 9/2015 | Genn et al. |
| 2016/0174792 A1 | | 6/2016 | Williamson et al. |
| 2016/0183749 A1 | | 6/2016 | Isley et al. |
| 2017/0079493 A1 | | 3/2017 | Genn et al. |
| 2017/0127895 A1 | | 5/2017 | Isley et al. |
| 2017/0209008 A1 | | 7/2017 | Sley et al. |
| 2017/0215669 A1 | | 8/2017 | O'Neill |
| 2017/0224180 A1 | | 8/2017 | Conrad et al. |
| 2017/0224181 A1 | | 8/2017 | Conrad et al. |
| 2017/0282328 A1 | | 10/2017 | King et al. |
| 2018/0255992 A1 | | 9/2018 | Sley et al. |
| 2018/0353027 A1 | | 12/2018 | Andrews et al. |
| 2019/0374080 A1 | | 12/2019 | Conrad et al. |
| 2020/0085268 A1 | | 3/2020 | O'Neill |
| 2022/0354327 A1 | * | 11/2022 | Kim ................. A47L 9/2847 |
| 2024/0041283 A1 | * | 2/2024 | Williamson ............. A47L 9/04 |

FOREIGN PATENT DOCUMENTS

| | | | | |
|---|---|---|---|---|
| CN | 201200378 Y | | 3/2009 | |
| CN | 100551318 C | | 10/2009 | |
| CN | 204813699 U | | 12/2015 | |
| CN | 204862978 U | | 12/2015 | |
| CN | 204889870 U | | 12/2015 | |
| CN | 105902238 A | | 8/2016 | |
| CN | 105942942 A | | 9/2016 | |
| CN | 107184155 A | | 9/2017 | |
| CN | 109528080 A | | 3/2019 | |
| CN | 208876404 U | | 5/2019 | |
| DE | 19706239 C1 | | 4/1998 | |
| DE | 29802879 U1 | | 6/1998 | |
| DE | 19855101 C2 | | 9/2001 | |
| DE | 10110768 A1 | | 3/2002 | |
| DE | 19805901 C2 | | 6/2002 | |
| DE | 102008056451 A1 | | 5/2010 | |
| DE | 202017107607 U1 | | 1/2018 | |
| DE | 102017117732 A1 | | 2/2019 | |
| DE | 102018116547 A1 | | 1/2020 | |
| EP | 1145677 B1 | | 11/2001 | |
| EP | 1027856 B1 | | 4/2003 | |
| EP | 1618822 A1 | | 1/2006 | |
| EP | 1989983 B1 | | 4/2014 | |
| EP | 1967114 B1 | | 5/2017 | |
| JP | 2020062209 A | | 4/2020 | |
| WO | WO-2011082830 A1 | * | 7/2011 | ............ A47L 11/302 |
| WO | WO-2015157196 A1 | * | 10/2015 | ............ A47L 5/362 |
| WO | 2017106900 A1 | | 6/2017 | |
| WO | 2019038446 A1 | | 2/2019 | |

OTHER PUBLICATIONS

PE2E Translation WO2011082830; Egler, Christian; Jan. 8, 2010; p. 1-8 (Year: 2010).*
Shark, "Shark TruePet Mini Motorized Brush for Shark HV320 Vacuum in Grey," <https://www.bedbathandbeyond.com/store/product/shark-reg-truepet-mini-motorized-brush-for-shark-hv320-vacuum-in-grey/1047699014?strategy=pdp_cav> web page visited Jul. 20, 2021.
Dyson, "Mini Motorized Tool," <https://www.dyson.com/support/journey/spare-details.967479-01> web page visited Jul. 20, 2021.
Dustless Technologies, "Floor Tools and Nozzles, for Hose Diameter 1 3/4 in, Plastic, 10 1/2 in Length, 11 in Width," <https://www.grainger.com/product/59NK82?gclid=EAlalQobChMl1tLF5vSz6AIVHP_jBx1_sQKDEAQYAiABEgLjM_D_BwE&cm_mmc=PPC:+Google+PLA&ef_id=EAlalQobChMl1tLF5vSz6AIVHP_jBx1_sQKDEAQYAiABEgLjM_

(56) References Cited

OTHER PUBLICATIONS

D_BwE:G:s&s_kwcid=AL!2966!3!56542747077!!!g!854483682848!> web page visited Jul. 20, 2021.

Ridgid, "1-1/4 in. or 2-1/2 in. Carpet and Hard Floor Nozzle Accessory for Wet Dry Shop Vacs," <https://www.homedepot.com/p/RIDGID-1-1-4-in-or-2-1-2-in-Carpet-and-Hard-Floor-Nozzle-Accessory-for-Wet-Dry-Shop-Vacuums-VT2530/100520393> web page visited Jul. 20, 2021.

Miele, "Miele STB101 Handheld Turbobrush," <https://www.homedepot.com/p/RIDGID-1-1-4-in-or-2-1-2-in-Carpet-and-Hard-Floor-Nozzle-Accessory-for-Wet-Dry-Shop-Vacuums-VT2530/100520393> web page visited Jul. 20, 2021.

Shop-Vac, "Shop-Vac 9069800 1-1/4 in. Turbo Nozzle," <https://www.walmart.com/ip/Shop-Vac-9069800-1-1-4-in-Turbo-Nozzle/25477652> web page visited Jul. 20, 2021.

International Search Report and Written Opinion for Application No. PCT/US2021/040786 dated Oct. 29, 2021 (11 pages).

Extended European Search Report for Application No. 21838446.9 dated May 24, 2024 (9 pages).

\* cited by examiner

FLOOR TOOL ATTACHMENT FOR USE WITH VACUUM CLEANER

CROSS-REFERENCE TO RELATED APPLICATIONS

This application claims priority to U.S. Provisional Patent Application No. 63/049,947 filed Jul. 9, 2020, the entire contents of which is incorporated by reference herein.

FIELD

The present disclosure relates to vacuum cleaner accessories and attachments. More particularly, the present disclosure relates to a battery-powered floor tool attachment for use with a vacuum cleaner.

SUMMARY

In one aspect, the present disclosure relates to an attachment for use with a vacuum cleaner. The attachment includes a head, a brush roll, an electric motor, and an attachment conduit. The head includes a suction opening defined therein, a brush roll cavity defined therein, and a battery cavity defined therein. The brush roll cavity is in fluid communication with the suction opening. The battery cavity has an elongate shape and a first longitudinal axis. The brush roll is rotatably coupled to the head. A majority of the brush roll is disposed within the brush roll cavity. The brush roll is rotatable about a rotational axis. The electric motor is disposed within the head. The electric motor drives the brush roll. The attachment conduit is in fluid communication with the suction opening. The attachment conduit is coupled to the head and has a second longitudinal axis. Each of the first longitudinal axis and the second longitudinal axis is angled relative to the rotational axis.

In another aspect, the present disclosure relates to an attachment for use with a vacuum cleaner. The attachment includes a head, a brush roll, an electric motor, and an attachment conduit. The head includes a battery cavity defined therein. The brush roll is disposed in the head. The brush roll is rotatable about a rotational axis. The electric motor is disposed in the head. The electric motor drives the brush roll. The attachment conduit is coupled to the head. The attachment conduit is arranged between the battery cavity and the electric motor in a direction parallel to the rotational axis.

In another aspect, the present disclosure relates to an attachment for use with a vacuum cleaner. The attachment includes a head, a power tool battery pack, a brush roll, a first electric motor, and an attachment conduit. The power tool battery pack is removably coupled to the head. The brush roll is rotatably coupled to the head. The first electric motor is disposed within the head. The first electric motor drives the brush roll. The attachment conduit is coupled to the head. The power tool battery pack is usable with the attachment to power the first electric motor when coupled to the head. The power tool battery pack is also usable with a separate power tool to power a second electric motor of the separate power tool when coupled to the separate power tool.

Features and aspects of the disclosure will become apparent by consideration of the following detailed description and accompanying drawings.

DETAILED DESCRIPTION

Figure 1:
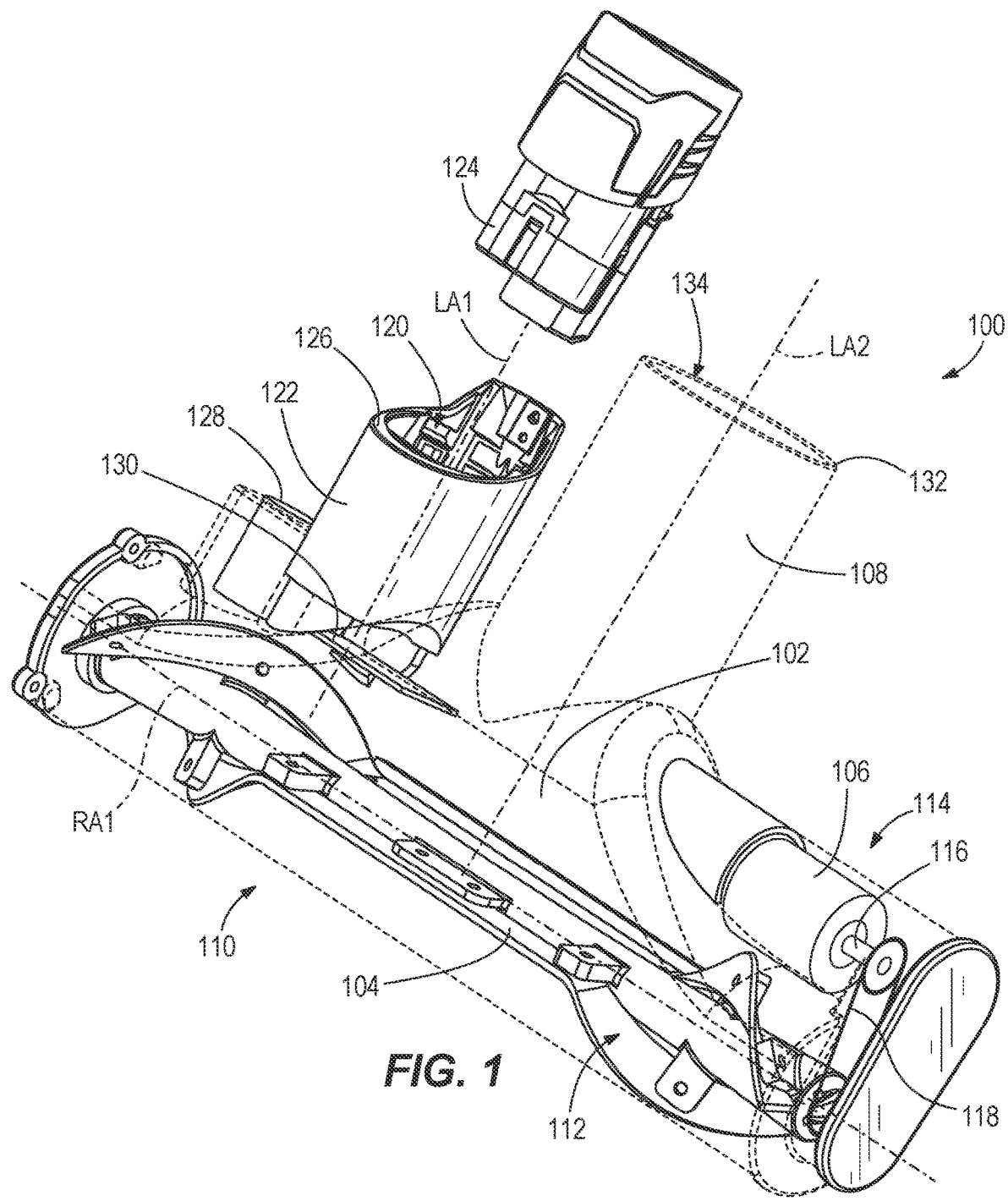
FIG. 1 is a perspective view of a floor tool attachment for use with a vacuum cleaner, according to one embodiment disclosed herein.
Figure 2:
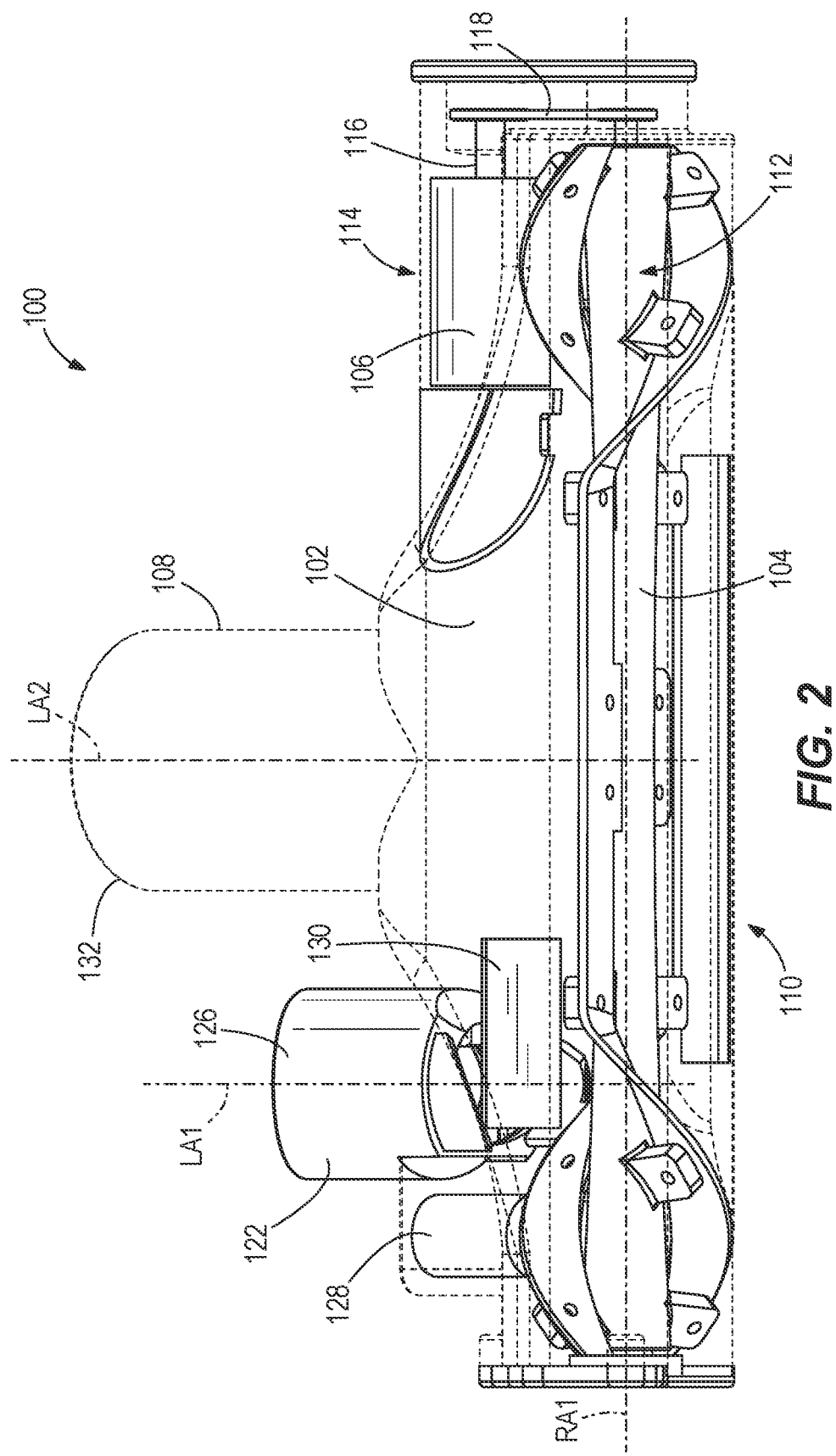
FIG. 2 is a front elevation view of the floor tool attachment of FIG. 1.
Figure 3:
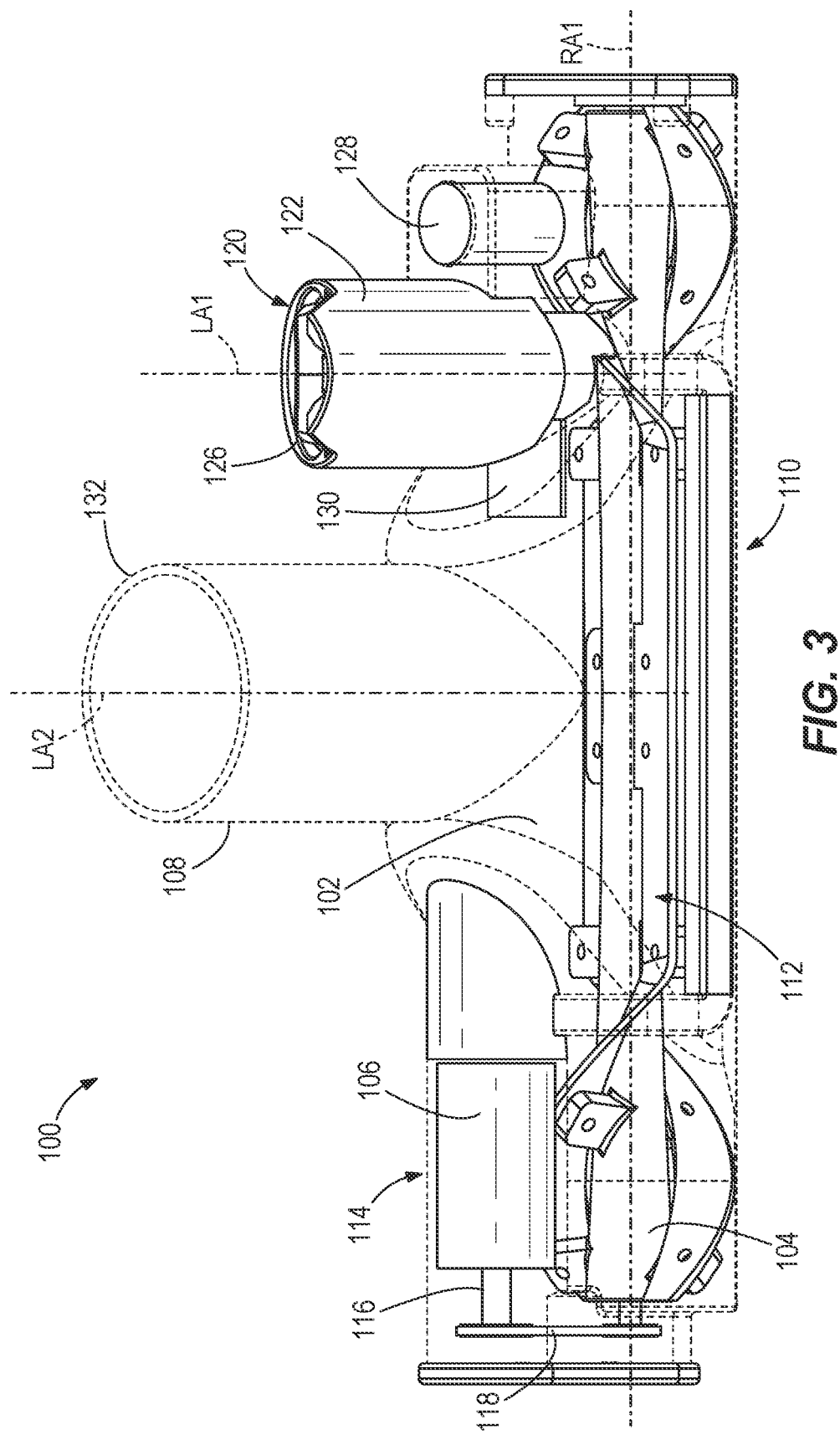
FIG. 3 is a rear elevation view of the floor tool attachment of FIG. 1.
Figure 4:
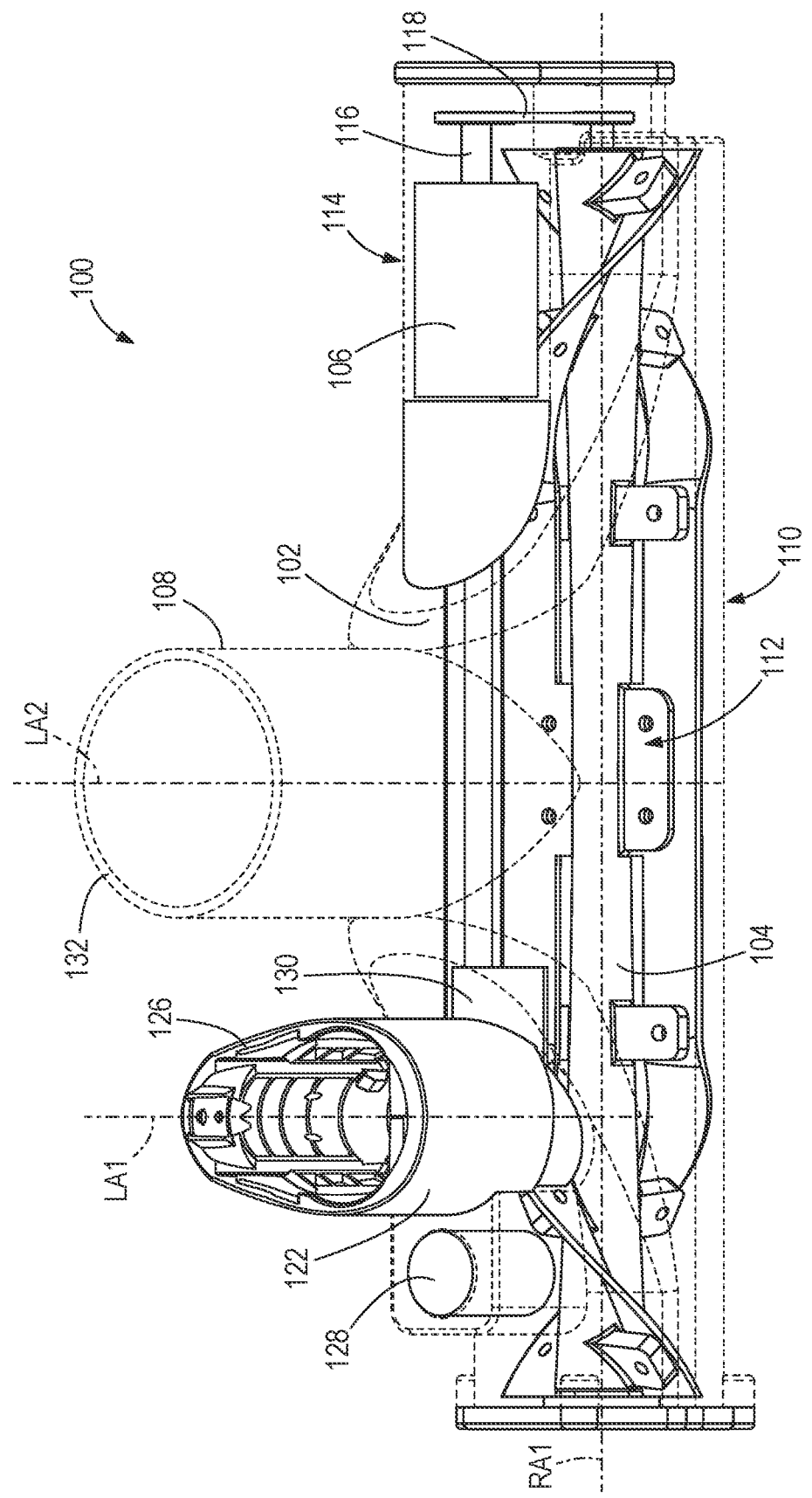
FIG. 4 is a top plan view of the floor tool attachment of FIG. 1.
Figure 5:
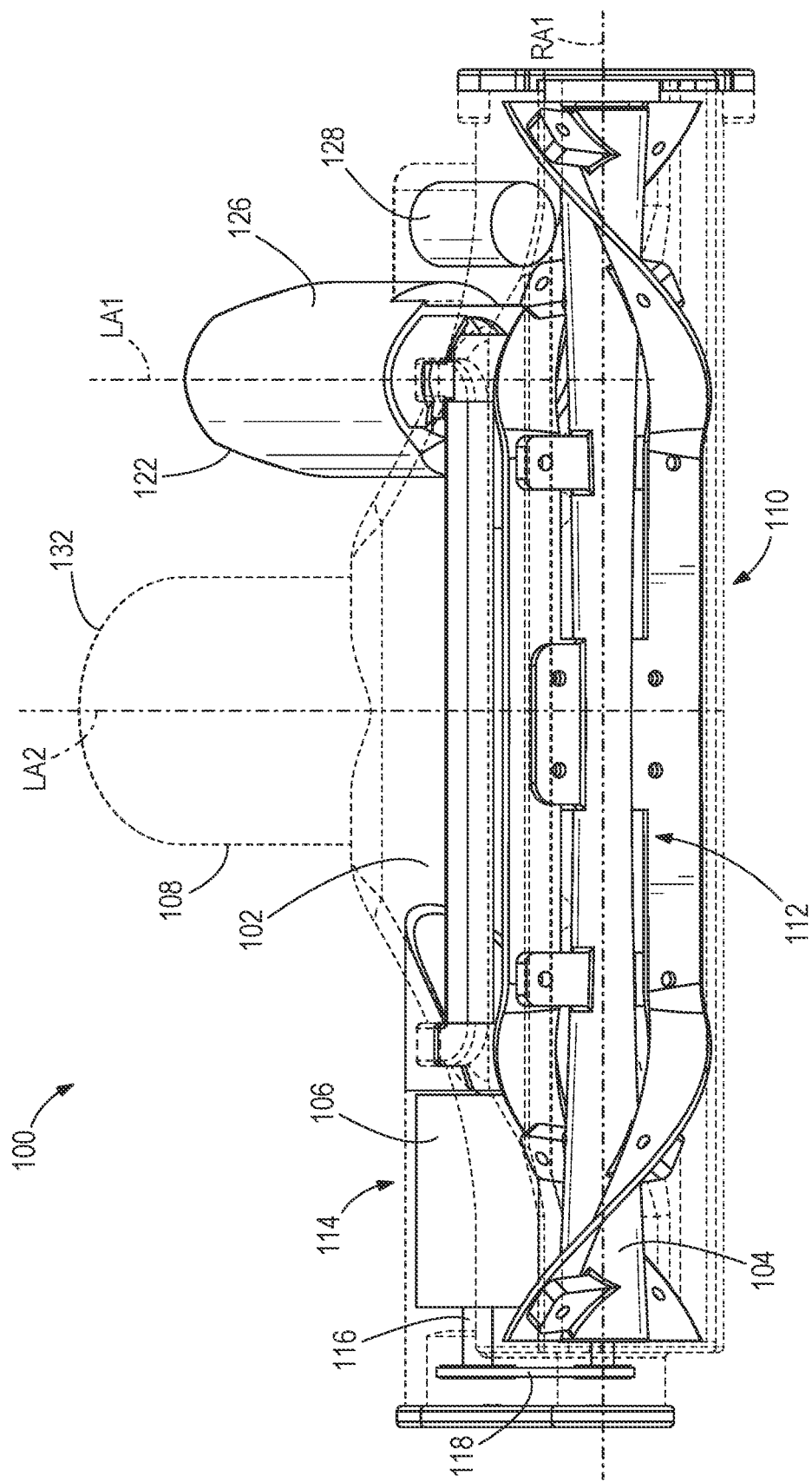
FIG. 5 is a bottom plan view of the floor tool attachment of FIG. 1.
Figure 6:
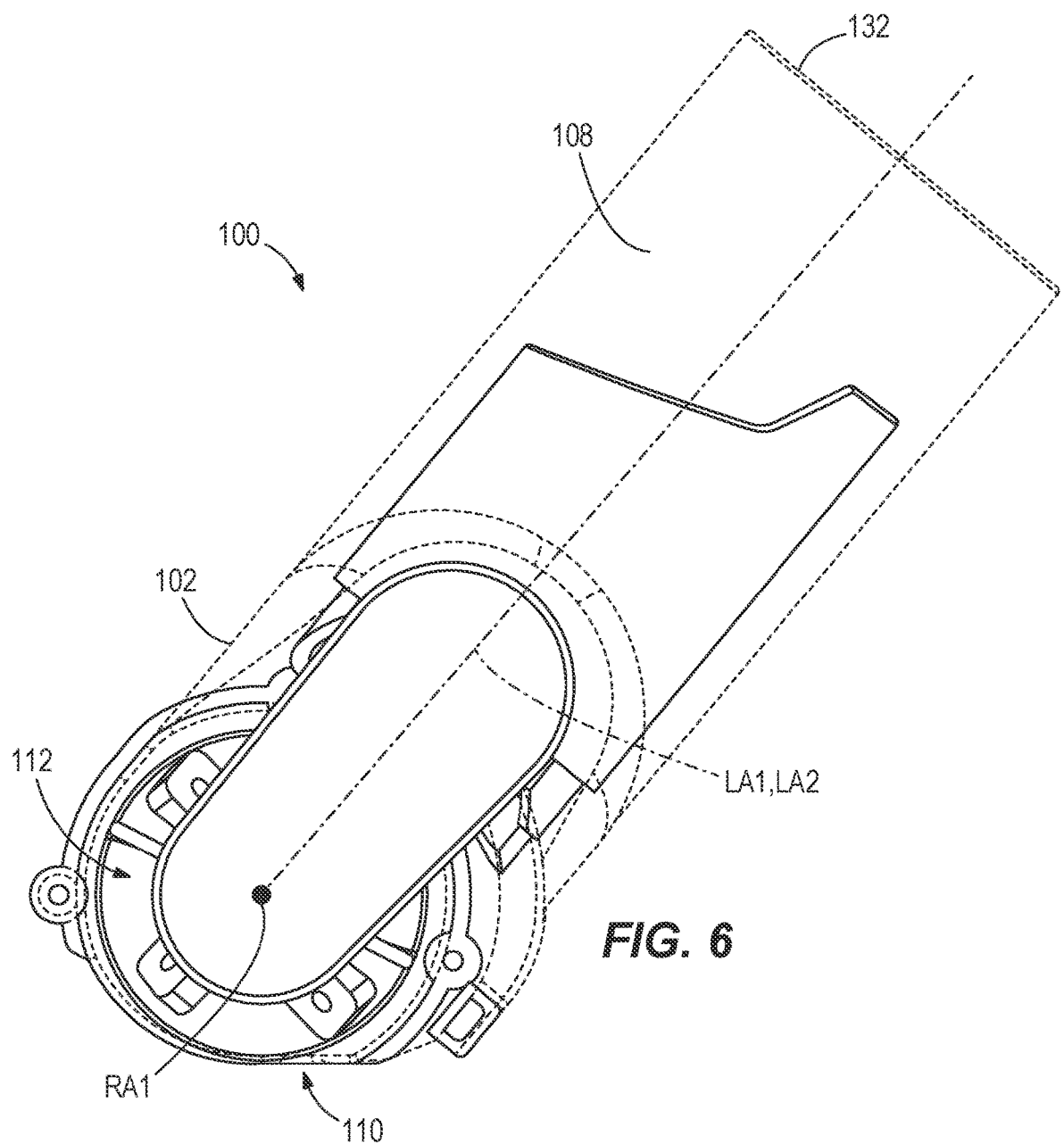
FIG. 6 is a left side elevation view of the floor tool attachment of FIG. 1.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting.

With reference to FIG. 1, an embodiment of a floor tool attachment 100 for use with a vacuum cleaner is shown. The floor tool attachment 100 includes a head 102, a brush roll 104, an electric motor 106, and an attachment conduit 108. The head 102 has two opposite ends with the brush roll 104 extending at least partially therebetween.

The head 102 may be a nozzle having a suction opening 110 defined therein. The suction opening 110 is placed adjacent a surface to be cleaned during operation of the floor tool attachment 100 and draws up dust, dirt, or other debris via suction provided by an attached vacuum cleaner (not shown). In the illustrated embodiment, the suction opening 110 is an elongate slot and extends along a majority of the length of the head 102.

The brush roll 104 is coupled to the head 102 and is configured to rotate at least partially within the head 102 for engaging a surface to be cleaned to facilitate debris collection. In some embodiments, the brush roll 104 extends a majority of distance between the two opposite ends of the head 102. In the illustrated embodiment, a brush roll cavity 112 is also defined in the head 102, and the brush roll cavity 112 is in fluid communication with the suction opening 110. The brush roll cavity 112 is located downstream from the suction opening 110 in the direction of airflow. The brush roll 104 is rotatably coupled to the head 102 in the brush roll cavity 112 and rotates about a rotational axis RA1. In some embodiments, at least a majority of the brush roll 104 is disposed in the brush roll cavity 112. The brush roll 104 may extend through the suction opening 110 such that engagement of the brush roll 104 with the surface to be cleaned cooperates with suction airflow into suction opening 110 to facilitate debris collection. In the illustrated embodiment, the brush roll 104 is disposed such that only a portion of surface-engaging members of the brush roll 104 extend beyond the suction opening 110 to engage the surface to be cleaned, for instance, to agitate and loosen ingrained dirt in a carpet. In some embodiments, the brush roll 104 may be a more conventional brush roll design having a dowel with one or more rows of helically arranged bristles that extend radially outwardly from the dowel. In such embodiments, the bristles would be considered the surface-engaging members.

The head 102 also includes a motor cavity 114 defined therein. The electric motor 106 is disposed in the motor cavity 114 and is operably connected to the brush roll 104 to facilitate rotation thereof. In some embodiments, the electric motor 106 is disposed nearer a second end of the head 102 than a first end of the head 102. In the illustrated embodiment, the electric motor 106 is positioned such that the driveshaft 116 of the electric motor 106 extends generally parallel to the rotational axis RA1 of the brush roll 104 and from the electric motor 106 toward the second end of the head 102. The electric motor 106 is indirectly coupled to the brush roll 104 via a drive belt 118 coupled to each of the driveshaft 116 and the brush roll 104. In this manner, the electric motor 106 drives the brush roll 104. In some embodiments, a drive chain, drive gears, or some other transmission arrangement may be used instead of the drive belt 118.

Figure 7:
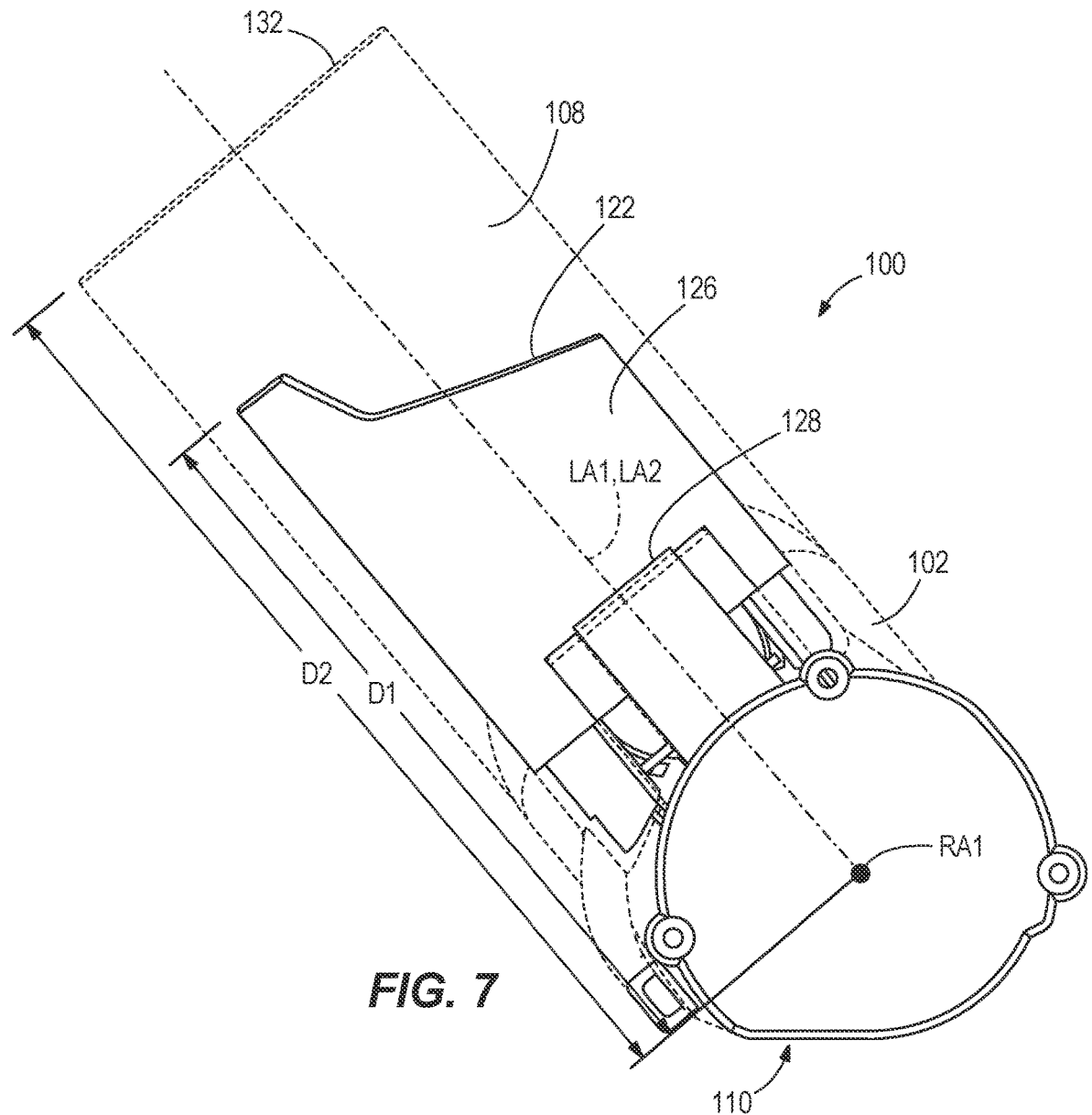
FIG. 7 is a right side elevation view of the floor tool attachment of FIG. 1.

The head 102 further includes a battery cavity 120 defined therein. In some embodiments, the battery cavity 120 is disposed nearer the first end of the head 102 than the second end of the head 102. The battery cavity 120 extends along a first longitudinal axis LA1. In some embodiments, at least a portion of the battery cavity 120 is recessed relative to at least one outer surface of the head 102. In other embodiments, at least a portion of the battery cavity 120 is defined outwardly from the head 102. In the illustrated embodiment, the floor tool attachment 100 further includes a battery mount 122 extending outwardly from the head 102 along the first longitudinal axis LA1. The battery mount 122 can be a variety of shapes and/or sizes to fit an appropriate battery pack 124. In the illustrated embodiment, the battery mount 122 is configured to receive a battery pack 124 that is also compatible with a variety of other battery-powered tools such as, for instance, power drills, power saws, blowers, work lights, or the like. The battery mount 122 is a generally hollow projection having a mount sidewall 126. In cross-section, the mount sidewall 126 is a generally circular sidewall surrounding the battery cavity 120. In some embodiments, therefore, the battery cavity 120 is a cylindrical battery cavity. In other embodiments, the battery cavity 120 may be a rectangular prism, a triangular prism, and elliptical prism, or the like. In some embodiments, the first longitudinal axis LA1 is generally normal to the rotational axis RA1. In some embodiments, the normal angle is also a perpendicular angle. That is, the first longitudinal axis LA1 and the rotational axis RA1 intersect instead of simply being oriented in planes that are perpendicular to each other. In other embodiments, however, the first longitudinal axis LA1 is oblique or parallel relative to the rotational axis RA1. In the illustrated embodiment as shown in FIG. 7, the battery mount 122 extends along the first longitudinal axis LA1 a first distance D1 away from the rotational axis RA1. In some embodiments, the battery cavity 120 also extends the first distance D1 away from the rotational axis RA1 due to the battery cavity 120 being defined by the battery mount 122. The battery pack 124 is slidably received in the battery cavity 120 along the first longitudinal axis LA1.

In some embodiments, the floor tool attachment 100 further includes a switch 128 disposed on or in the head 102. The switch 128 selectively electrically communicates the battery pack 124 with the electric motor 106. In the illustrated embodiment, the switch 128 is a push button, but other embodiments may include different types of switches such as, for instance, a tab, a knob, or the like. The switch 128, in some embodiments, may directly control the electrical communication between the battery pack 124 and the electric motor 106. In some embodiments, the switch 128 is disposed between the battery cavity 120 and the first end of the head 102. In some embodiments, the switch 128 is actuatable in a direction parallel to the first longitudinal axis LA1 and a second longitudinal axis LA2 (described in more detail below).

The floor tool attachment 100 may further include a printed circuit board (PCB) 130. In the illustrated embodiment, the PCB 130 can function as a controller to control the transfer of electrical energy from the battery pack 124 to the electric motor 106, the speed of the electric motor 106, the illumination of one or more lights (not shown), or the like. Further, some embodiments may include one or more sensors (not shown) that may send signals to the PCB 130 corresponding to brush roll speed, brushroll current, air pressure within the floor tool attachment 100, carpet height, movement speed of the floor tool attachment 100, or the like. In some embodiments, the PCB 130 has a length that extends parallel to the rotational axis RA1 of the brush roll 104.

The floor tool attachment 100 also includes an attachment conduit 108 for transporting dirty air containing debris drawn into the head 102 to a collection chamber (not shown) of the vacuum cleaner. The attachment conduit 108 extends outwardly from the head 102 along the second longitudinal axis LA2. In some embodiments, the attachment conduit 108 is arranged between the battery cavity 120 and the electric motor 106 in a direction parallel to the rotational axis RA1. The attachment conduit 108 includes a conduit sidewall 132 and a conduit opening 134 defined by the conduit sidewall 132. The conduit sidewall 132 can be a variety of shapes and/or sizes to fit a corresponding wand, hose, or nozzle of a corresponding vacuum cleaner. In the illustrated embodiment, the conduit sidewall 132 is generally circular in cross-section. The attachment conduit 108 is in fluid communication with the suction opening 110 and the brush roll cavity 112. The floor tool attachment 100 is configured such that dirt is picked up through the suction opening 110, passes through the brush roll cavity 112, passes through the attachment conduit 108, and exits the conduit opening 134. Because the attachment conduit 108 is sized and/or shaped to couple to a component of the vacuum cleaner (not shown), the dirt then is captured by, for instance, the dirt cup of the vacuum cleaner after exiting the conduit opening 134 and traveling through the nozzle, wand, and/or hose of the vacuum cleaner. In some embodiments, the second longitudinal axis LA2 is generally normal to the rotational axis RA1 of the brush roll 104. In some embodiments, the normal angle is also a perpendicular angle. That is, the second longitudinal axis LA2 and the rotational axis RA1 intersect instead of simply being oriented in planes that are perpendicular to each other. In the illustrated embodiment, the second longitudinal axis LA2 is also generally parallel with the first longitudinal axis LA1 such that the battery cavity 120 and the attachment conduit 108 extend generally parallel to each other away from the rotational axis RA1. As shown in FIG. 7, the attachment conduit 108 extends away from the rotational axis RA1 a second distance D2 along the second longitudinal axis LA2. In some embodiments, the second distance D2 is longer than the first distance D1. For instance, the first distance D1 may have a length that is more than one third of the length of the second distance D2. In some embodiments, the first distance D1 has a length that is more than one half of the length of the second distance D2. In some embodiments, the attachment conduit 108 is wider than the battery cavity 120.

Figure 8:
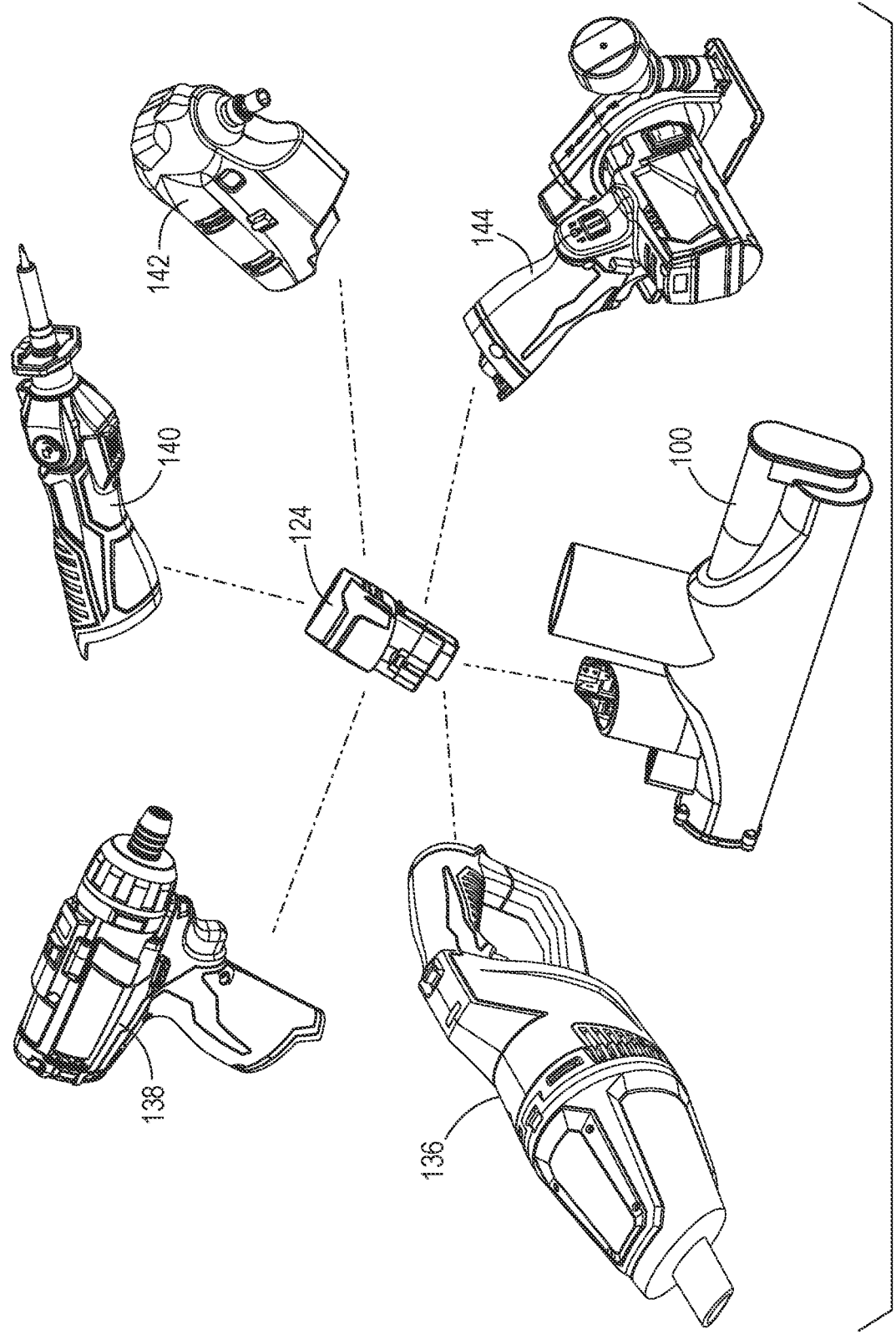
FIG. 8 is a perspective view of a battery for use with the floor tool attachment of FIG. 1 as well as other example power tools.

With reference to FIG. 8, the battery pack 124 is shown as being connectable to a variety of tools including the floor tool attachment 100. Other tools usable with the battery pack 124 include, for instance, a handheld vacuum cleaner 136, a drill/driver 138, a soldering iron 140, a palm impactor 142, a saw 144, or the like. In this sense, the battery pack 124 is a typical power tool battery pack usable with a variety of power tools compatible with the same battery pack 124. The battery pack 124 powers an electric motor, heating element, speaker, light, and/or other battery-powered components of the various power tools when coupled thereto.

Various features of the disclosure are set forth in the following claims.

What is claimed is:

1. An attachment for use with a vacuum cleaner, the attachment comprising:
   a head including
      a suction opening defined in the head as an elongate slot defining a plane,
      a brush roll cavity defined in the head, the brush roll cavity in fluid communication with the suction opening, and
      a battery cavity defined in the head and configured to support a battery pack therein, the battery cavity having an elongate shape and a first longitudinal axis;
   a brush roll rotatably coupled to the head and configured to engage a ground surface to be cleaned through the suction opening, a majority of the brush roll disposed within the brush roll cavity, the brush roll rotatable about a rotational axis;
   an electric motor disposed within a motor cavity of the head; the electric motor configured to drive the brush roll;
   a controller located within the head and configured to control the transfer of electrical energy from the battery pack to the electric motor;
   an attachment conduit in fluid communication with the suction opening, the attachment conduit coupled to the head and having a central axis extending along the attachment conduit in an airflow direction through the attachment conduit;
   wherein each of the first longitudinal axis and the central axis is angled transverse to the plane of the suction opening and wherein the central axis is generally parallel and fixed relative to the first longitudinal axis,
   wherein the elongate shape of the battery cavity is defined at least partially by a battery mount extending outwardly from the head;
   wherein the battery cavity provides an electrical connection between the controller and the battery pack positioned within the battery cavity, and
   wherein the motor cavity and the brush roll cavity collectively define an interior volume of the head and the battery cavity extends inwardly such that at least a portion of the battery cavity is positioned lower than a portion of the interior volume when the suction opening is positioned adjacent the ground surface, and the battery cavity extends outwardly with the battery mount such that at least a portion of the battery cavity is positioned above the interior volume when the suction opening is positioned adjacent the ground surface.

2. The attachment of claim 1, wherein
the first longitudinal axis and the central axis are generally normal to the rotational axis.

3. The attachment of claim 2, wherein
the electric motor includes a driveshaft extending generally parallel to the rotational axis.

4. The attachment of claim 1, wherein
the battery cavity slidably receives the battery pack along the first longitudinal axis.

5. The attachment of claim 1, further comprising
a switch disposed on the head, the switch configured to selectively electrically couple the electric motor with the battery pack.

6. The attachment of claim 1, wherein
the battery mount includes a generally circular sidewall.

7. The attachment of claim 1, wherein
the battery mount extends away from the rotational axis a first distance along the first longitudinal axis,
the attachment conduit extends from the rotational axis a second distance along the central axis, and
the first distance is more than one third of the second distance.

8. The attachment of claim 7, wherein
the first distance is more than one half of the second distance.

* * * * *